United States Patent [19]

Nicholson

[11] Patent Number: 5,354,072

[45] Date of Patent: Oct. 11, 1994

[54] HOLLOW METAL SEALING RINGS

[75] Inventor: Terence P. Nicholson, Hexham, Great Britain

[73] Assignee: Specialist Sealing Limited, Jersey, Channel Islands

[21] Appl. No.: 181,964

[22] Filed: Jan. 18, 1994

Related U.S. Application Data

[63] Continuation of Ser. No. 937,447, Aug. 27, 1992, abandoned, which is a continuation of Ser. No. 754,165, Sep. 3, 1991, abandoned, which is a continuation-in-part of Ser. No. 630,041, Dec. 19, 1990, abandoned.

[30] Foreign Application Priority Data

Dec. 19, 1990 [GB] United Kingdom ............. 8928648.8

[51] Int. Cl.⁵ ............................................. F16J 15/08
[52] U.S. Cl. ................................. 277/206 R; 277/236
[58] Field of Search .................. 277/205, 206 R, 236, 277/180, 105; 285/111, 917

[56] References Cited

U.S. PATENT DOCUMENTS

| | | | |
|---|---|---|---|
| 2,126,505 | 8/1938 | Risser | 277/206 |
| 2,184,246 | 5/1965 | Kline | 277/206 R |
| 2,211,983 | 8/1940 | Parris | 285/917 |
| 3,046,026 | 7/1962 | Burrows | 277/205 |
| 3,058,750 | 10/1962 | Taylor | 285/917 |
| 3,204,971 | 9/1965 | Meriano | 285/917 |
| 3,279,806 | 10/1966 | Bialkowski | 277/205 |
| 3,561,792 | 2/1971 | Rode | 285/111 |
| 3,561,793 | 2/1971 | Rode | 285/13 |
| 3,758,123 | 9/1973 | Ksieski | 277/206 |
| 4,204,716 | 5/1980 | Baylor | 277/206 R |
| 4,452,462 | 6/1984 | Karr, Jr. | 285/917 |
| 4,477,087 | 10/1986 | Sutter, Jr. et al. | 277/236 |

FOREIGN PATENT DOCUMENTS

| | | | |
|---|---|---|---|
| 0698130 | 11/1964 | Canada | 277/236 |
| 1592109 | of 0000 | France | F16J 15/02 |
| 0817534 | 9/1937 | France | 285/917 |
| 1048979 | 11/1966 | United Kingdom . | |
| 1368773 | 10/1974 | United Kingdom | F16J 15/08 |
| 2038961 | 7/1980 | United Kingdom | F16J 15/48 |
| 2187805 | 9/1987 | United Kingdom | F16J 15/08 |
| 2239496 | 7/1991 | United Kingdom | F16J 15/08 |

Primary Examiner—Diego F. F. Gutierrez
Assistant Examiner—Daniel G. DePumpo
Attorney, Agent, or Firm—Ohlandt, Greeley & Ruggiero

[57] ABSTRACT

According to a first aspect of the invention a metal sealing ring has a hollow cross section which is open at its radially innermost side and has limbs generally directed towards the radially innermost side. The radially outermost region of the cross section is provided with reinforcement so as to locally increase its hoop strength. According to a second aspect of the invention, a hollow self-energising metal sealing ring and a seating for the sealing ring are provided with complimentary radial cross sectional shapes which cooperate to limit the rotation of the sealing ring cross section when axially compressed.

As can be seen in FIG. 11, the surfaces 45 are tangential to the convex arcuate contact lines C, in the relaxed state of the seal ring. During compression these surfaces remain substantially tangential to the regions C, as the limbs flex.

18 Claims, 6 Drawing Sheets

HOLLOW METAL SEALING RINGS

This is a continuation of application Ser. No. 07/937,447, filed Aug. 27, 1992, now abandoned which is a continuation of Ser. No. 07/754,165, now abandoned which is a continuation in part of Ser. No. 07.630,041 12/19/90 now abandoned.

FIELD OF THE INVENTION

This invention relates to hollow metal sealing rings, and in particular to sealing rings of the so called low-load self-energizing static kind, as used for example in valves, pumps, motors and other apparatus to form leakproof seals between opposed, usually plane, parallel surfaces of flanges and the like.

DISCUSSION OF PRIOR ART

One known form of sealing ring has a radial cross section of C shape, with the open side of the C facing the center of the ring. Another known seal is that known as the "Ellipseal" (Trade Mark), described in British patent specification 2187805, comprising a radial cross section of modified parabolic form with convergent margins. A further known seal is that of GB 2038961, in which the limbs of the seal cross section have out-turned lips, forming an Ω-shaped cross section.

The above-mentioned seals have been very successful in numerous static sealing applications, but are not always entirely successful in meeting the demands of sealing equipment and pipelines used in natural gas fields, where pressures are commonly in the region of 10000 PSI, and may exceed 30000 PSI.

A reason for the lack of success with the known seals when sealing extremely high pressures, is their lack of hoop strength. Because of this, the seal rings expand under the applied internal fluid pressure until they can expand no further because of the restriction imposed by the recesses in which the seals sit. During this change of diameter of the seal ring, the areas of the seal ring surface in contact with the mating faces to be sealed are subjected to a galling action which roughens the surfaces, and in most cases it becomes impossible to establish a satisfactory seal. If the thickness of the seal ring metal is increased, to increase the hoop strength, the flexibility of the seal is substantially reduced, as the seals are made of metal of constant thickness. This then requires larger bolts and increased torque to compress the seal, and makes the seal less able to cope with rotation of the flanges to be sealed, i.e. loss of paralellism, which can occur under the action of the pressure of a contained fluid.

An object of the present invention is to provide a self-energizing metal seal capable of overcoming the described shortcomings of the known seals, and in particular capable of providing reliable sealing against a fluid at very high pressure.

SUMMARY OF A FIRST ASPECT OF THE INVENTION

According to a first aspect of the present invention a metal sealing ring has a cross section which is hollow and open on its radially inner side and has convergent limb regions at this side, and the radially outermost region is provided with reinforcement locally increasing its hoop strength. Preferably the reinforcement of this outermost region is provided by a greater thickness of material than radially inner limb regions which in use engage the surfaces to be sealed.

The increased material thickness in the radially outermost region and resulting increased hoop strength resist expansion of the seal in use, whereas the smaller thickness of inner regions, comprising the flexible limbs which contact the surfaces to be sealed, provides ample flexibility. Relative movement of the seal and sealed surfaces is therefore reduced or eliminated, so that the seal is not subjected to galling and roughening, but the load required to compress the seal is not substantially increased and the seal remains sufficiently flexible to accommodate misalignment and lack of parallelism of the surfaces to be sealed.

In this the present seal contrasts significantly with the conventional seals, which are made of metal of constant thickness.

In one possible embodiment of the invention, the radial cross section of the seal ring may comprise a circular internal surface, and a generally elliptical or modified parabolic external surface.

The hoop strength of the seal ring can be further increased by broadening (in the axial direction) the outer rim or heel region of the seal ring that is of increased thickness.

The present invention can provide a seal in which both hoop strength and limb flexibility can be selected within wide ranges, independently of one another.

DISCUSSION OF PRIOR ART

Another problem that can arise with the known seals, in particular with the seal described in GB 2187805, is that the seal cross section may rotate and expand in diameter, when compressed between the surfaces to be sealed. The pressure contact points at which the clamping pressure effectively acts on the seal cross section, may also move during compression.

SUMMARY OF A SECOND ASPECT OF THE INVENTION

According to another aspect of the present invention, a hollow self-energizing metal seal ring and its seating are provided with complementary cross sectional shapes which cooperate to limit rotation of the seal cross section when compressed.

In the case of a seal ring of non-circular external cross section, e.g. as in GB 2187805, the seal ring may be seated in a groove or recess of stepped profile, the step cooperating with the non-circular external profile of the seal ring, particularly in the radially outermost region of the seal ring, to prevent rotation of the seal ring cross-section under load. Alternatively, the radially outermost region of the seal ring may for example be provided with an axially extending projection forming an abutment to cooperate with a groove or recess of conventional rectangular cross section; this measure is applicable to seal rings of circular radial cross section. The projection or abutment may also serve to increase the hoop strength of the seal ring.

The second aspect of the present invention is applicable to seal rings in accordance with the first aspect of the invention and also to otherwise conventional seal rings including seals of circular C cross section and seal rings in accordance with GB 2187805.

A further embodiment of the invention is particularly applicable to situations in which there is exceptionally high pressure to seal, and/or a tendency to separation of the flanges or other surfaces to be sealed owing to the extremely high pressures.

According to this further embodiment, in a metal sealing ring of the kind generally according to the foregoing, the reinforcement of the radially outermost region is provided by an increase of the thickness of the ring material in this region; this thicker region is shaped to provide an axially broad outer rim or heel surface generally parallel to the axis of the ring; the radially innermost free ends of the limb regions have axially outwardly projecting tips which provide the maximum axial dimension of the ring in its relaxed state; and the limb regions have, radially external to the said projections, regions of reduced axial thickness providing points of preferential flexing of the inner ends of the limb regions during axial compression.

In this ring, the limb tips and the intermediate regions of the limbs form primary and secondary seals.

This ring is also non-rotatable in its seat.

In one embodiment the axial dimension is less than the radial dimension of the ring cross section between its radially innermost and outermost surfaces. In one form of the ring according to this embodiment of the invention, the limb regions are convergent on their axially outer surfaces, for example along circular or other arcs blending into the regions of least thickness, whereas the internal profile of the ring cross section comprises axially inner limb surfaces which, in the relaxed condition, are substantially parallel to each other, being interconnected at their radially outer sides by a smoothly blended part-circular or other arc.

BRIEF DESCRIPTION OF THE DRAWINGS

The present invention will be further described with reference to the accompanying drawings, in which.

DETAILED DESCRIPTION OF PREFERRED EMBODIMENTS

Figure 1:
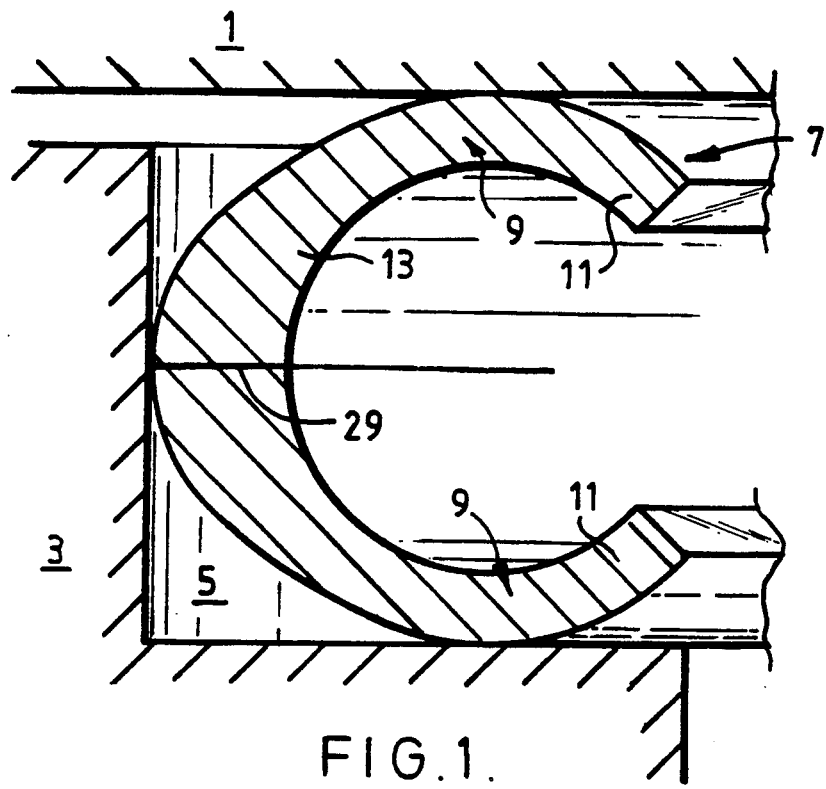
FIG. 1 shows a seal according to a first embodiment of the invention, in position between two surfaces to be sealed, but before compression.
Figure 2:
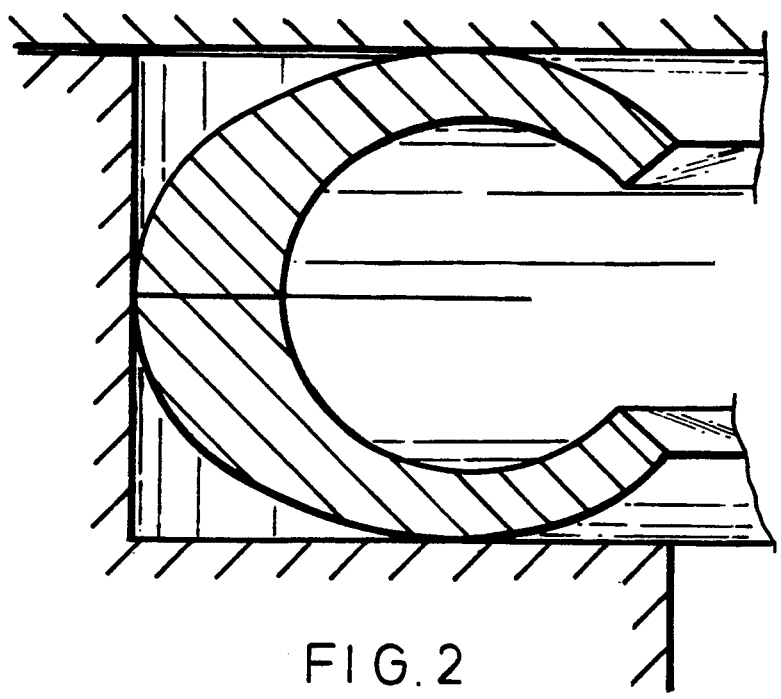
FIG. 2 shows the same seal, fully compressed.

FIGS. 1 and 2 show parts of upper and lower faces 1, 3 to be sealed, for example pipe end flanges in a natural gas pipeline. The upper flange 1 has a plane surface, the lower flange has a rectangular recess 5 at the end of the pipeline bore, and a seal ring 7 is seated in the recess 5.

The seal ring is of metal with a hollow cross section, open on its radially inner side, that is to say, towards the pipeline bore so that the fluid being conveyed has access to the interior of the seal ring cross section and the pressure of this fluid therefore acts on the interior of the seal ring to force its limbs 9 into contact with the flange surfaces. The limbs 9 have convergent margins 11, so that the external surface of the ring is convex when it meets the flange surfaces.

The internal surface of the seal ring cross section is circular. The external surface of the seal ring cross section is non-circular and is such that the thickness of the metal of the seal ring is essentially constant in the convex limbs 9, but is increased in the radially outermost heel or rim region 13.

The thicker heel region 13 enhances the hoop strength of the seal ring, without reducing the flexibility of the limbs 9.

The relationship between the thickness of the heel and the limbs is selected according to the required hoop strength and flexibility in relation to the intended application of the seal. For fluid pressures in the region of 10000 PSI the thickness ratio may be in the region of 2:1. For extremely high pressures the ratio may be 3:1.

The profile of the external surface is also open to choice according to the desired application and manufacturing considerations. It may for example be elliptical or modified elliptical, parabolic or modified parabolic, or a combination of circular arcs.

It is not essential that the internal surface of the cross section be circular, nor is it essential that the limbs 9 be of constant thickness.

Figure 3:
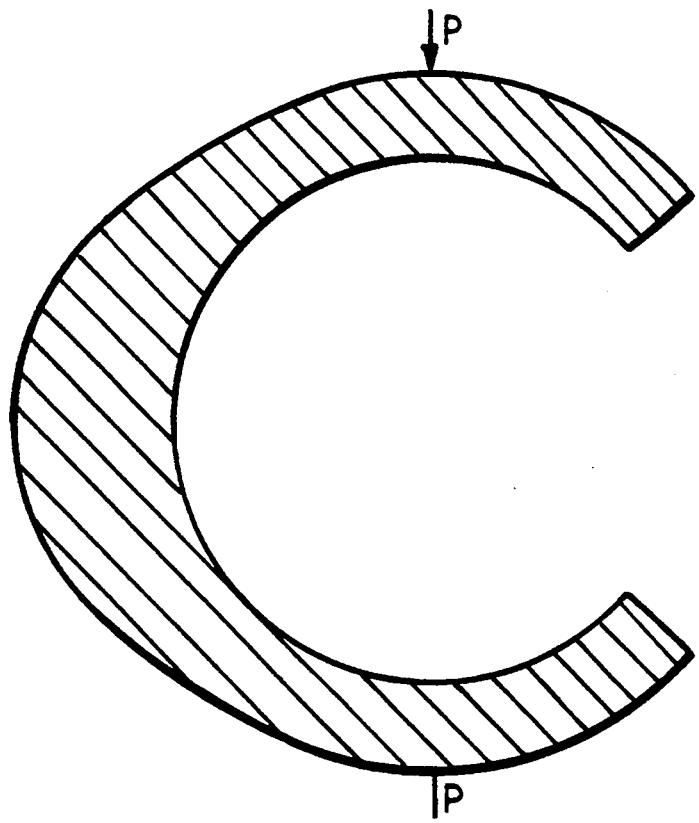
FIG. 3 shows significant dimensions of the same seal.

FIG. 3 shows one form of seal ring cross section, suitable for sealing fluids of moderately high pressure.

The seal cross section or profile is defined within a square of side A. The limb regions are of constant thickness t and the internal surface of the cross section is circular, of radius $(A/2-t)$, center 0.375 A outwards from the radially inner side of the enclosing square, that is to say, from the radially innermost limit of the seal cross section.

The radially outermost heel region of the cross section has a maximum thickness 2 t, and the external surface of the cross section in this region has a radius $(A/4-t)$. This arc is connected to the circular arc of radius $(A/2)$ defining the external surfaces of the limbs, by tangential arcs of radius A connecting the arcs of radius $A/2$ to the arcs of radius $(A/4+t)$.

As already mentioned, for extremely high pressures the thickness at the heel may be three times the limb thickness. In this case, the position of the center of curvature of the limbs would be at 0.25 A from the radially innermost limit of the cross section.

It is to be understood that, although the described seal has its cross section contained within a square, this is not essential and in particular, the radial dimension of the cross section may be increased relative to its axial dimension in order to increase the fluid pressure the seal is capable of containing.

FIG. 3 also shows the compression points at P.

Figure 4:
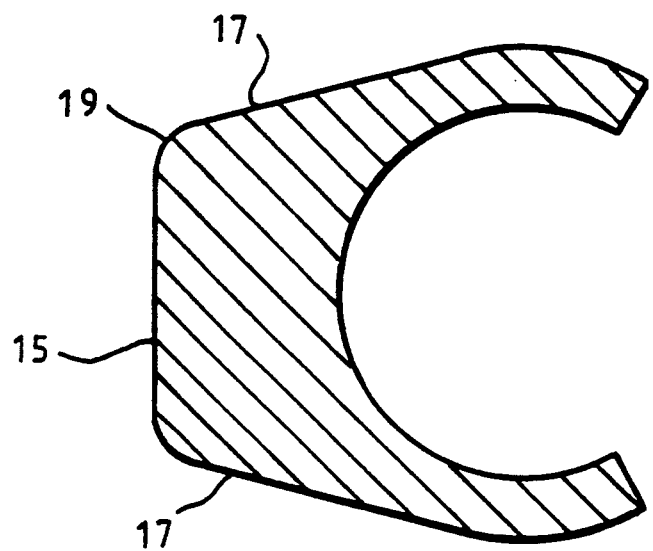
FIG. 4 shows a modification of the seal cross section.

The seal ring described so far has a cross sectional profile based on circular arcs tangential to one another. FIG. 4 shows an alternative profile. In this, the thicker heel region has an effectively cylindrical outermost surface 15, joined to the circular arcs defining the limbs by frusto-conical surfaces 17 tangential to the limbs, and radiused transitions 19. This profile substantially increases the hoop strength of the heel region. In the illustrated seal the heel region has a radial thickness of 3 t and its surface 15 has an axial extent of A/2. The profile of the seal shown in FIG. 4 is contained within a square of side A, and the internal surface of the cross-section is circular, as in FIG. 3, but spaced radially outwardly by A/4 from the radially inner side of the enclosing square, that is to say, the radially innermost limit of the seal cross-section.

As already mentioned, it is desirable that rotation of the seal ring cross section within its seat be prevented. The modified profile illustrated in FIG. 4, with its cylindrical outermost surface 15, cooperates directly with the cylindrical radially outer surface of the recess or seat 5 to prevent such rotation.

Figure 5:
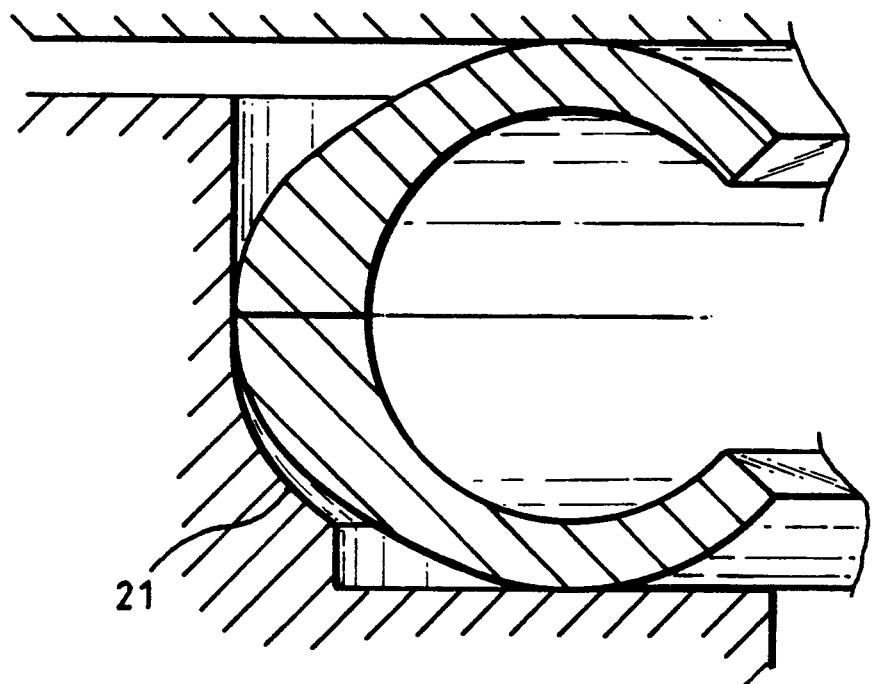
FIGS. 5 to 9 show further modified seal cross sections.

FIG. 5 shows a seat recess modified to cooperate with a seal ring as shown in FIG. 1, to prevent such rotation. Specifically, the recess has a stepped profile comprising an arcuate shoulder 21 which cooperates with the non-circular heel of the seal ring to prevent rotation of the seal ring cross section during compression.

Figure 6:
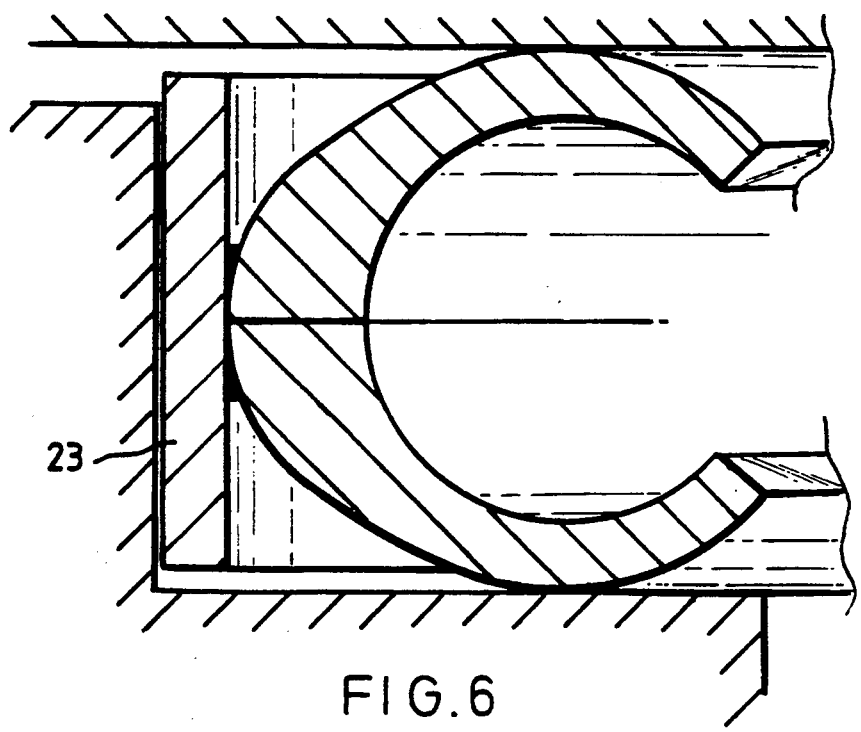

FIG. 6 shows a cylindrical ring 23 brazed or welded to the exterior of the heel, with an axial extent corresponding to or slightly less than the axial dimension of the seal ring when fully compressed. The ring 23 cooperates with a conventional rectangular recess to prevent rotation of the seal ring cross section.

Figure 7:
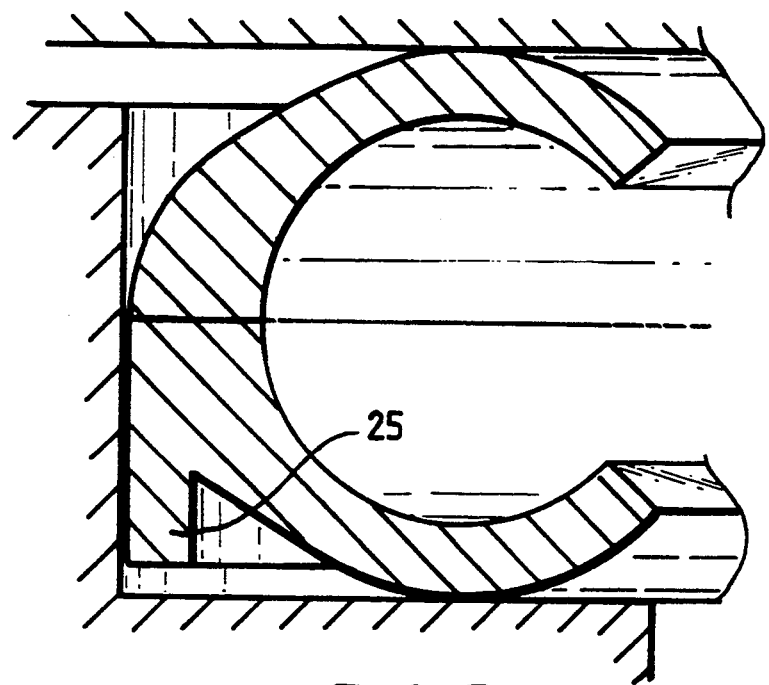

FIG. 7 shows a seal ring with an integral, or brazed or welded, axial projection 25 from one side of the heel, serving the same purpose of preventing rotation.

Figure 8:
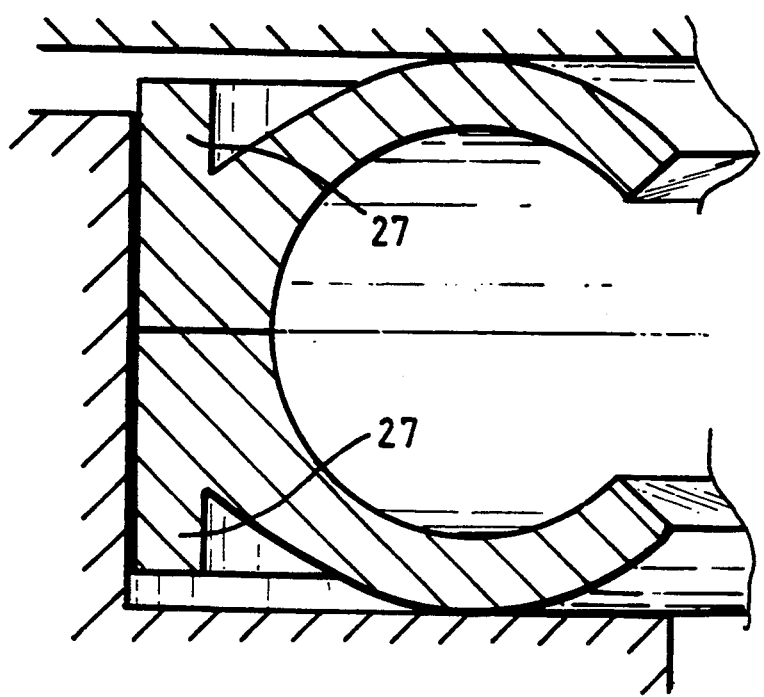

FIG. 8 shows a seal ring with integral projections 27 on both axial sides of the heel.

An advantage of the profiles illustrated in FIGS. 7 and 8 is that they do not increase the overall radial dimension of the seal ring cross section, in contrast to the seal ring illustrated in FIG. 6.

These measures for preventing rotation of the seal ring cross section are also applicable to seal rings made of material of constant thickness, as described for example in GB 2187805. When applied to such rings, the measures for preventing rotation, illustrated in FIGS. 6 to 8, have the further advantage of increasing the hoop strength without reducing flexibility of the limbs.

Figure 9:
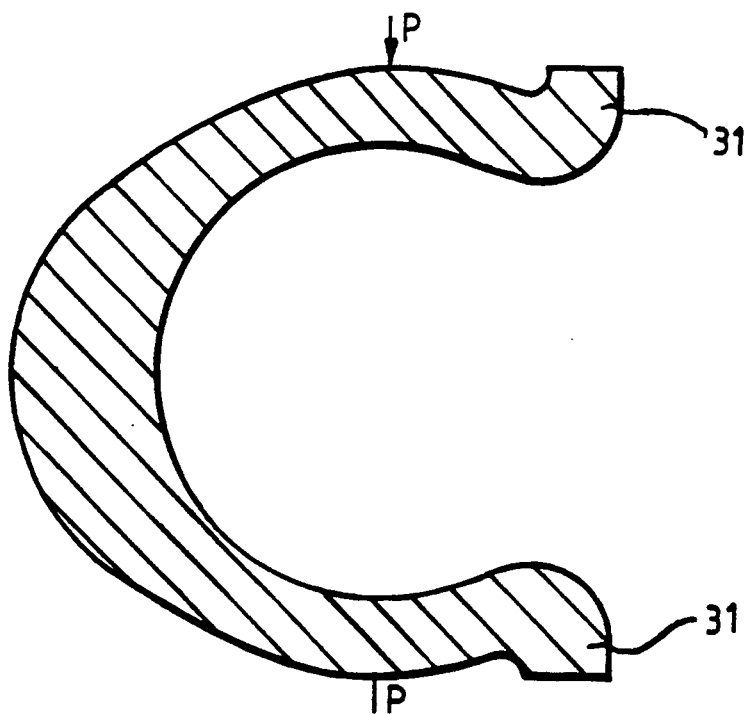

FIG. 9 shows a seal ring in which the outer or heel region has a thickened profile as shown in FIG. 3, but the inner ends of the limbs have axially outwardly turned lips 31, so that the profile is approximately that of the greek letter n, resembling in this the seal disclosed in GB 2038961. The elements of the seal in FIG. 9 have the same proportional relationships as the seal shown in FIG. 3.

These outwardly turned lips have the advantage of preventing the seal from rotating in its seat in addition to the high unit loading contact points between the mating faces.

Figure 10:
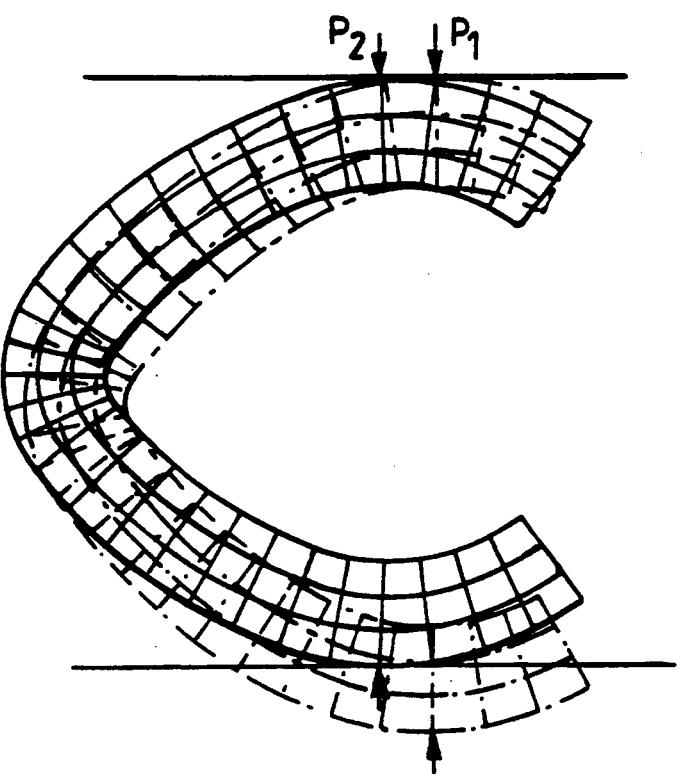
FIG. 10 shows the behaviour of a conventional seal when compressed.

FIG. 10 shows the result of a finite-element analysis of the "Ellipseal" disclosed in GB 2187805. The seal profile before compression is shown in broken lines, the profile after compression in solid lines. The fact that the seal profile has rotated and expanded in diameter during compression is clearly visible, as is the fact that the pressure contact point has moved from P1 outwards to P2. Accordingly, within the scope of the present invention, the rotation-preventing measures illustrated in FIGS. 5 to 8 may be applied to the "Ellipseal" of GB 2187805.

Figure 11:
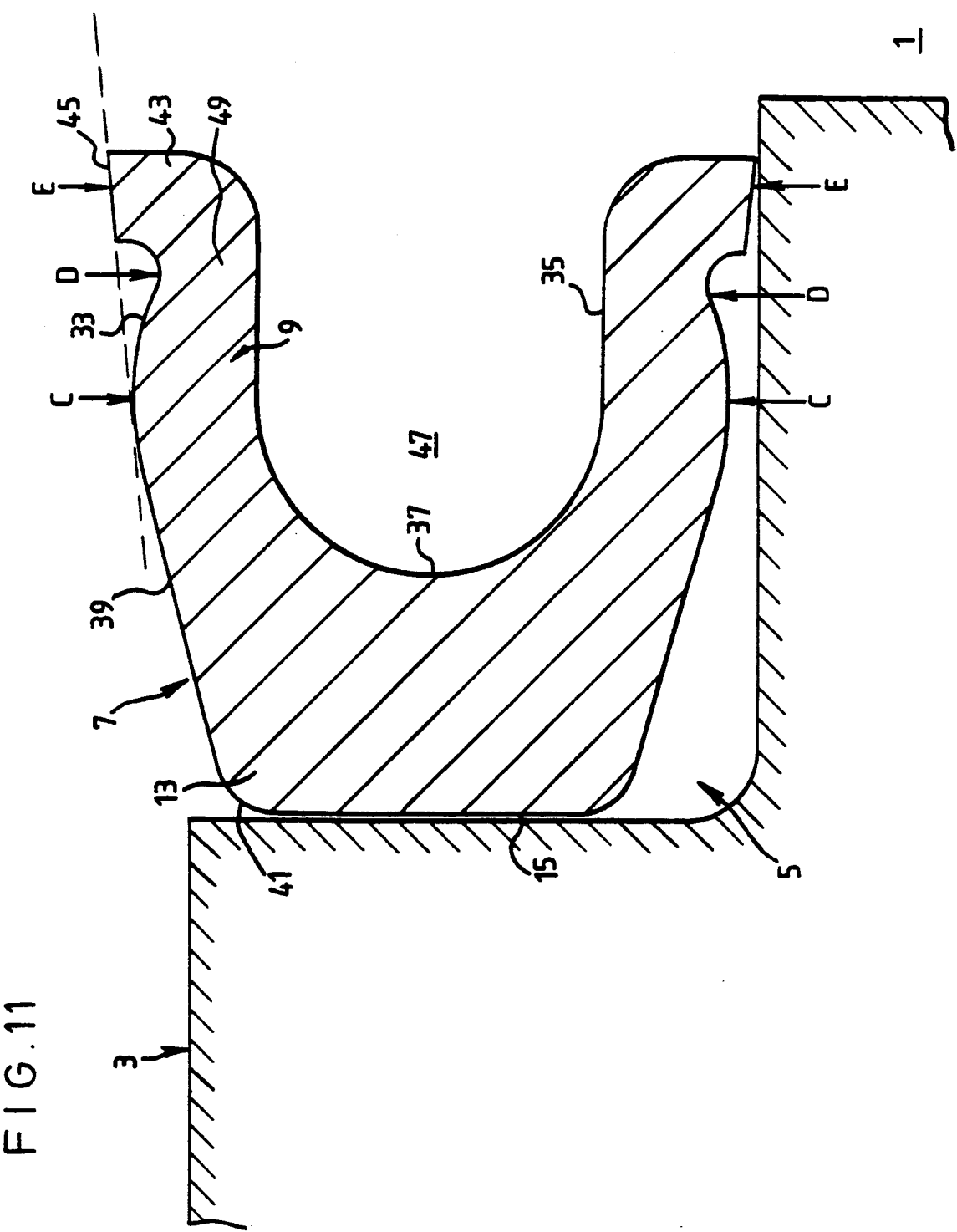
FIG. 11 shows a seal according to a further embodiment of the invention, seated in a recess.

FIG. 11 shows part of a lower flange 3 to be sealed against an upper flange (not shown), for example pipe end flanges in a natural gas pipeline. The upper flange has a plane surface, the lower flange has a rectangular recess 5 at the end of the pipeline bore 1, and a hollow metal sealing ring 7 is seated in this recess. The overall axial dimension A of the sealing ring in its relaxed condition is greater than the axial depth of the recess, so that one axial side of the ring projects relative to the flange surface and is compressed in the axial direction by the opposite flange in use. In the illustrated case, the depth of the recess is 0.88 A.

With the exception of the radial extent B of the ring cross section, all of the dimensions of the ring cross section are related to the maximum axial dimension A, and a preferred set of relationships between the ring dimensions is illustrated in the drawings. As already described, in one specific embodiment B=A.

The ring shown in FIG. 11 combines certain aspects of the rings shown in FIGS. 4 and 9 but is modified to cope with higher pressures and greater flange separations.

The seal ring is of metal with a hollow cross section, open on its radially inner side, that is to say, towards the pipeline bore so that the fluid being conveyed has access to the interior of the seal ring cross section and the pressure of this fluid therefore acts on the interior of the seal ring to force its limbs 9 into contact with the flange surfaces. The limbs 9 have arcuate convergent external margins 33, so that the external surface of the ring is convex where it meets the flange surfaces.

The internal surface of the seal ring cross section is a U-shaped groove 47 with parallel surfaces 35 joined by a semi-circular surface 37. The external surface of the seal ring cross section is non-circular and is such that the thickness of the metal of the seal ring is increased progressively into the radially outermost heel or rim region 13.

The thicker heel region 13 enhances the hoop strength of the seal ring, without reducing the flexibility of the limbs 9.

The relationship between the thickness of the heel and the limbs is selected according to the required hoop strength and flexibility in relation to the intended use.

The thicker heel region has an effectively cylindrical outermost surface 15, joined to the circular arcs 33 defining the limbs by frusto-conical surfaces 39 tangential to the limbs, and radiused transitions 41. This profile substantially increases the hoop strength of the heel region. In the illustrated seal the heel surface 15 has an axial extent of 0.6 A.

It is desirable that rotation of the seal ring cross section within its seat be prevented. The cylindrical outermost surface 15 cooperates directly with the cylindrical radially outer surface of the recess or seat 5 to prevent rotation.

The inner ends of the limbs have axially outwardly turned lips 43, so that the profile is approximately that of the Greek letter $\Omega$.

These outwardly turned lips also prevent the seal from rotating in its seat.

The outwardly turned lips 43 have generally axially facing flat surfaces 45, which converge with one another in the radially outward direction. Thus, when these lips are put under compression between the flanges, it is the radially innermost edges or angles of the lips 43 which first come under compression, as these define the maximum axial dimension A of the sealing ring.

Because the internal surfaces 35 of the ring cross section are plane radial surfaces whereas the outer surfaces 11 are convergent arcuate surfaces, regions 49 of minimum thickness of the limbs are defined, immediately radially outside the lips 43.

When the illustrated sealing ring is compressed axially, the points E at the radially innermost extremities of the lip surfaces 45, are the first to contact the mating faces of the flanges. Under compression, initially the lips 43 are compressed, flexing about the regions 49 of least thickness, until the flanges make contact with the next widest part of the ring cross section, at the positions C on the convex portion of the ring profile. At this time, the surfaces 45, having rotated under the initial compression, lie substantially flat against the flange surfaces.

Accordingly, at this time there is a primary seal at positions E (surfaces 45) and a secondary seal at positions C. Because the limb thickness at points C is greater than in regions radially inwards from these points, and increases further, radially outwards of the points C, the contact pressure at the points C is much greater than that at the points E. During further compression of the sealing ring, now effecting compression at the points C, the limbs flex at the radiused diameter of surface 37 of the internal groove 47 in the sealing ring.

To cope with extremes in flange separation or rotation, as may occur in the sealing of pressure vessels, the radial distance between points C and E can be increased as necessary.

It will be seen that the ring of FIG. 11 provides a two-stage sealing action, in which sealing contact is initially made only at the relatively flexible lips 43, forming a primary seal, and after initial compression a further, stronger, secondary seal is formed at the position C. This, together with the increased radial extent of the seal ring cross section and in particular of the flattened heel region, enable the sealing ring to cope with the most extreme sealing conditions. In a preferred embodiment the ring shown in FIG. 11 has the following proportions relative to the overall axial dimension A: a thickness over points C of 0.9 A; a thickness over points D of minimum limb thickness 0.84 A; an internal spacing between limbs of 0.54 A; a radius of internal surface 37 of 0.27 A; a center of curvature of internal surface 37 of 0.375 A radially outwards from the radially innermost limit of the seal cross-section; a radial thickness of limb tips 0.16 A; and a radius of transition surface between internal surface 35 and axial limb tip surface of 0.15 A.

The surfaces 45 should be given a high surface finish and close tolerances, for example by machining and lapping.

The present seals can be manufactured for example by machining from solid; by a combination of machining and rolling; or by initially manufacturing two ring halves and then welding these together on a radial surface perpendicular to the seal ring axis, as shown at 29 in FIG. 1.

In the case of a seal ring of welded construction, the individual ring halves can be made by machining from plate, by pressing, or in any other convenient way.

Welding can for example be by TIG or micro-plasma welding, but electron beam welding is preferred owing to its lower heat input, making it possible to weld without difficulty sections having a heel thickness up to 35 mm.

Particularly in the case of a seal made by electron beam welding, it may be desirable to heat treat the seal after welding, for example by re-solution heat treatment, before any subsequent age hardening treatment.

Seals embodying the invention can be made of any suitable metal. High nickel alloys are particularly suitable, for example Nimonic (registered trade mark) and Inconel (registered trade mark). A suitable alloy for sub-sea sour well applications is Inconel 718.

The spring characteristics of the seal and therefore its recovery factor after compression can be greatly improved by age-hardening.

The seals may be coated before use with a protective and/or low friction coating for example lead, silver, gold, nickel, PTFE, or a combination of nickel or other metal and PTFE. The last mentioned combination is valuable for reducing galling during compression, when an Inconel seal is compressed between Inconel flanges, or more generally, when nickel alloy seals are used in conjunction with nickel-containing or coated flanges.

What is claimed is:

1. A seal ring adapted to be compressed and decompressed in the axial direction of the ring between first and second axially spaced sealing surfaces substantially parallel to each other, said seal ring comprising a resilient metal sealing ring having a radial cross-section which is hollow and is open at the radially innermost side of the ring cross-section and comprises axially spaced first and second limbs resiliently compressible and decompressible axially towards each other, each said limb having a respective axially outwardly facing convex arcuate contact line intermediate its radial extent for sealingly contacting a respective said surface, wherein the configuration of said seal ring is such that each said limb does not substantially deform upon use, and having a respective radially inner region, said limbs being joined together in the radially outermost region of said ring cross-section; said radially outermost region being of increased thickness relative to the limbs such as to increase the hoop strength of the ring locally at said radially outermost region so as not to permit the permanent deformation of said seal ring, and having a substantially cylindrical radially outermost external surface; each said radially inner region having an axially outwardly facing convex arcuate external surface, with the respective said external surfaces being mutally convergent with decreasing radius towards said radially innermost side of said ring cross-section, said limbs defining in cross-section an internal profile which is of smoothly blended, concave arcuate form at least in the radially outer portion thereof.

2. The seal ring set forth in claim 1 wherein the seal ring radial cross-section comprises, between said cylindrical radially outermost external surface and each said convex arcuate contact line, a respective rectilinear axially outwardly facing external surface region, said rectilinear surface regions being mutually convergent with one another with increasing radius from the center of the ring towards said cylindrical external surface.

3. The seal ring set forth in claim 1 wherein each limb further has at the radially inner extremity of said radially inner region a radially innermost free end region which is turned axially outwardly towards the adjacent one of said surfaces.

4. The seal ring set forth in claim 3 wherein said radially innermost free ends of said limb regions have axially outwardly projecting tips which provide the maximum axial dimension of said ring in its uncompressed state, said limb regions having, radially externally adjacent said tips, regions of reduced axial thickness providing points of preferential flexing of said inner ends of said limbs during axial compression of the ring.

5. The seal ring set forth in claim 4 wherein said limbs comprise respective axially inner surfaces and wherein in the uncompressed condition, said axially inner surfaces are substantially parallel and are interconnected at their radially outer extremities by said smoothly blended arcuate form profile.

6. The seal ring set forth in claim 4 wherein said axially outwardly projecting tips have axially outwardly facing terminal surfaces which are flat.

7. The seal ring set forth in claim 6 wherein said flat terminal surfaces are tangential to said convex arcuate contact lines.

8. The seal ring set forth in claim 1 wherein said respective radially inner limb regions have substantially constant thickness.

9. The seal ring set forth in claim 2 wherein said respective radially inner limb regions have substantially constant thickness.

10. A seal comprising in combination: first and second members to be sealed, each said member having thereon a sealing surface, with the respective sealing surfaces substantially parallel to each other and mutually opposite to and spaced from each other; and a resilient metal sealing ring axially compressed and decompressed between said surfaces; said metal sealing ring having a radial cross-section which is hollow and is open at the radially innermost side of the ring cross-section and comprises axially spaced first and second limbs resiliently compressible and decompressible axially towards each other, each said limb having a respective axially outwardly facing convex arcuate contact line intermediate its radial extent for sealingly contacting a respective said surface, wherein the configuration of said seal ring is such that each said limb does not substantially deform upon use, and having a respective radially inner region, said limbs being joined together in the radially outermost region of said ring cross-section; said radially outermost region being of increased thickness relative to the limbs such as to increase the hoop strength of the ring locally at said radially outermost region so as not to permit the permanent deformation of said sealing ring, and having a substantially cylindrical radially outermost external surface; each said radially inner region having an axially outwardly facing convex arcuate external surface, with the respective said external surfaces being mutually convergent with decreasing radius towards said radially innermost side of said ring cross-section, said limbs defining in cross-section an internal profile which is of smoothly blended, concave arcuate form at least in the radially outer portion thereof.

11. The seal set forth in claim 10 wherein each said limb further has at the radially inner extremity of said radially inner region a radially innermost free end region which is turned axially outwardly towards the adjacent one of said surfaces.

12. The seal set forth in claim 11 wherein said radially innermost free ends of said limb regions have axially outwardly projecting tips which provide the maximum axial dimension of said ring in its uncompressed state, said limb regions having, radially externally adjacent said tips, regions of reduced axial thickness providing points of preferential flexing of said inner ends of said limbs during axial compression of the ring.

13. The seal set forth in claim 12 wherein said maximum axial dimension of said ring is not more than the radial dimension of the ring cross-section between the radially innermost and outermost surfaces of said ring.

14. The seal set forth in claim 12 wherein said limb regions comprise respective axially inner surfaces and wherein in the uncompressed condition, said axially inner surfaces are substantially parallel and are interconnected at their radially outer extremities by a smoothly blended arc.

15. The seal set forth in claim 52 wherein at least one said member is shaped to form a seating for said sealing ring, said seating comprising a recess with a substantially cylindrical radially outermost surface adjacent said cylindrical radially outermost external surface of said sealing ring, whereby said cylindrical surfaces cooperate to limit rotation of the sealing ring cross-section when axially compressed.

16. The seal set forth in claim 10 wherein the sealing ring radial cross-section comprises, between said radially outermost external surface and each said convex arcuate contact line, a respective rectilinear axially outwardly facing external surface region, said rectilinear surface regions being mutually convergent with one another with increasing radius from the center of the ring.

17. The seal set forth in claim 12 wherein said axially outwardly projecting tips have axially outwardly facing terminal surfaces which are flat.

18. The seal set forth in claim 17 wherein said flat terminal surfaces are tangential to said convex arcuate contact lines.

* * * * *